(12) United States Patent
Ierfone

(10) Patent No.: US 9,139,244 B2
(45) Date of Patent: Sep. 22, 2015

(54) SOUND EMITTING HANDGRIP FOR A TUBULAR HANDLEBAR

(75) Inventor: Frank Anthony Ierfone, Victoria (AU)

(73) Assignee: Sonic Grip Limited, Victoria (AU)

( * ) Notice: Subject to any disclaimer, the term of this patent is extended or adjusted under 35 U.S.C. 154(b) by 309 days.

(21) Appl. No.: 13/704,936

(22) PCT Filed: Jun. 20, 2011

(86) PCT No.: PCT/AU2011/000743
§ 371 (c)(1),
(2), (4) Date: Jun. 27, 2013

(87) PCT Pub. No.: WO2011/156873
PCT Pub. Date: Dec. 22, 2011

(65) Prior Publication Data
US 2013/0269473 A1 Oct. 17, 2013

(30) Foreign Application Priority Data
Jun. 18, 2010 (AU) ................................ 2010902664

(51) Int. Cl.
*G08B 21/00* (2006.01)
*B62J 3/00* (2006.01)
*B62K 21/26* (2006.01)

(52) U.S. Cl.
CPC . *B62J 3/00* (2013.01); *B62K 21/26* (2013.01); Y10T 74/20822 (2015.01)

(58) Field of Classification Search
CPC .................................. B62J 3/00; B62K 21/26
USPC ................... 340/425.5, 432; 381/389; 280/63
See application file for complete search history.

(56) References Cited

U.S. PATENT DOCUMENTS

| 5,083,108 A | 1/1992 | Guest |
| 7,995,787 B2 | 8/2011 | Ierfone et al. |
| 2005/0029766 A1 | 2/2005 | Ierfone et al. |
| 2008/0037818 A1 | 2/2008 | Ierfone et al. |

FOREIGN PATENT DOCUMENTS

| EP | 1033155 A1 | 9/2000 |
| WO | WO 92/14643 A1 | 9/1992 |
| WO | WO 03/035191 A1 | 5/2003 |

OTHER PUBLICATIONS

International Search Report for PCT Application PCT/AU2011/000743; Dated Jun. 20, 2011.

*Primary Examiner* — Jeffery Hofsass
(74) *Attorney, Agent, or Firm* — Garcia-Zamor IP Law; Ruy M. Garcia-Zamor

(57) ABSTRACT

A handgrip assembly including a sound emitting assembly, the handgrip assembly adapted to be slid over and into a tube end at an end portion of a tubular handlebar.

7 Claims, 2 Drawing Sheets

SOUND EMITTING HANDGRIP FOR A TUBULAR HANDLEBAR

FIELD OF THE INVENTION

This invention concerns the incorporation of audible sound emitting devices onto or into the handlebars of personal transport means. It has particular application to bicycles, tricycles, wheelchairs and other transport means having a tubular frame. The sound emitting devices may be used as an alarm, a warning device or as a means of greeting or identification.

BACKGROUND TO THE INVENTION

A wide variety of warning devices is available in the marketplace for use on bicycles and tricycles. These include conventional bicycle bells and air horns with rubber bulbs. Also known are battery powered buzzers which attach to the handlebars in much the same way as a conventional bicycle bell, and which have a button on the casing of the buzzer which, when pressed, causes an appropriate noise to be emitted from the casing.

Existing warning devices protrude out substantially from the frame of the bicycle, are not well protected from the elements or from knocks, and detract from the clean lines of the machine.

An aim of one aspect of the present invention is to provide a sound emitting device which may be used as a warning device which overcomes the abovementioned difficulties on a tubular framed transport means such as a bicycle.

One particulary desirable device for this purpose is described in international patent publication no. WO 03/035191. It describes a sound emitting assembly where a package of electronic components including a sound generator and an electric power source are all located inside a tubular handlebar while the actuating switch is located outside the tubular handlebar distal of the tube end.

It has now been found that a different configuration of components provides a more robust assembly and makes it more convenient to allow for the over-moulding of a wide variety of soft resilient gripping portions using a common internal configuration.

SUMMARY OF THE INVENTION

In one aspect the present invention provides a handgrip assembly including a sound emitting assembly, the handgrip assembly adapted to be slid over and into a tube end at an end portion of a tubular handlebar, and the handgrip assembly comprising:

a gripping portion adapted to be retained on the outside surface of said end portion of the handlebar, said gripping portion having:

a proximal end which in use lies at or closely adjacent the end of the tube, and a distal end which in use lies away from the end of the tube; and a source of stored electric power which in use is retained on the inside of the end portion of the handlebar; wherein said gripping portion comprises a resilient foam portion moulded onto a rigid frame portion, said rigid frame portion being moulded from plastics material and comprising:

a main body portion which extends around at least most of the circumference of the tube at said distal end, a rigid elongate tail portion which extends from the main body portion to at least substantially the proximal end, an actuating switch located in said main body portion;

a sound emitting assembly located in said main body portion, said sound emitting assembly comprising an electronically actuated sound generator, and an electronic circuit to feed a signal to the sound generator; wherein said sound emitting assembly and said actuating switch are linked to said source of stored electric power by an electric pathway which extends along said rigid tail portion such that when the switch is activated by a user, a sound is emitted from said sound generator in the handgrip.

Preferably said sound emitting assembly and said actuating switch are linked to said source of stored electric power by an electric pathway which extends within said rigid tail portion. Preferably the electric pathway comprises conducting wires or strips moulded into said rigid tail portion.

Preferably said electric pathway extends from said rigid tail portion to pass from outside to inside the tube at the end of the tube.

The main body portion of the rigid frame portion may extend completely around the tube at said distal end of the gripping portion. Alternatively the main body portion of the rigid frame portion may extend mostly but not completely around the tube at said distal end of the gripping portion.

The rigid frame portion is preferably an integral moulding and the sound generator and electronic circuit are bonded thereto before the resilient foam portion is moulded thereto.

BRIEF DESCRIPTION OF THE DRAWINGS

In order that the invention may be more fully understood there will now be described, by way of example only, preferred embodiments and other elements of the invention with reference to the accompanying drawings where.

DESCRIPTION OF THE PREFERRED EMBODIMENTS AND OTHER EXAMPLES OF THE INVENTION

Figure 1:
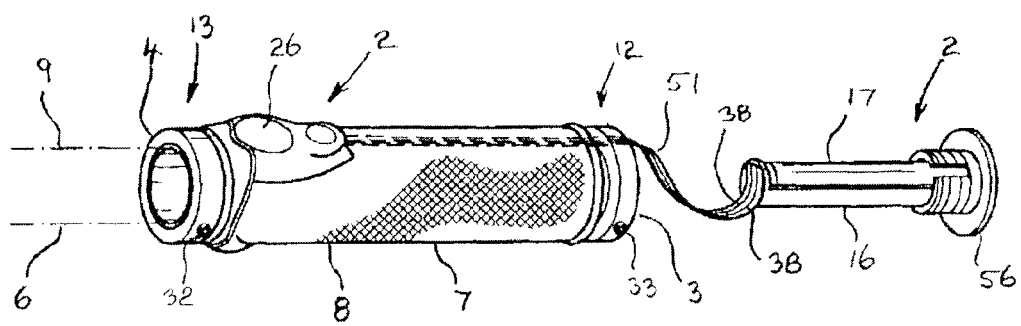
FIG. 1 is a view of one embodiment of the invention as it is applied for use as a handgrip for a handlebar of a bicycle.
Figure 2:
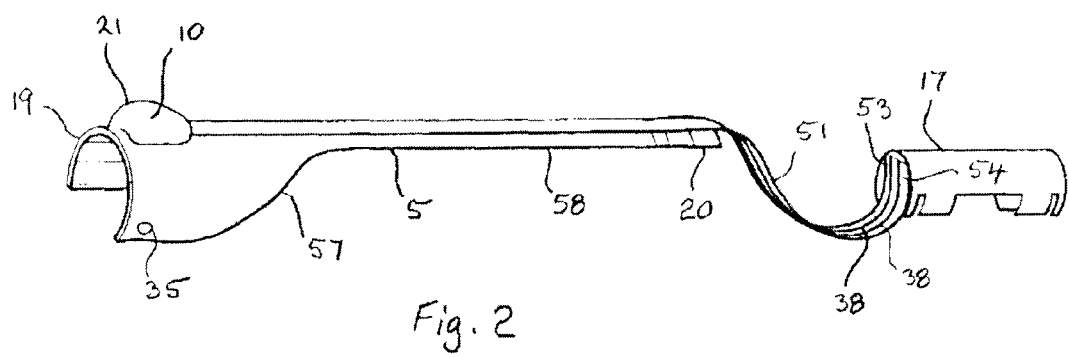
FIG. 2 is a view of some components of the handgrip shown in FIG. 1.

Referring to FIGS. 1 and 2, one embodiment of the invention takes the form of a handgrip 8 shown fitted to one end of the handlebars 6 of a bicycle. The handlebar 6 has the form of a tube 9 and is shown in FIG. 1 as a dashed line. The handgrip 8 incorporates a sound emitting device 2 which may act as a warning device. The handgrip 8 slips over the outside of the handlebar tube 9. It has a gripping portion 7 made of soft resilient foam material which is moulded onto a frame 5. The handgrip 8 also comprises a first rigid collar 3 at the proximal (outboard) end 12 of the handgrip and a second rigid collar 4 at the distal (inboard) end 13 of the handgrip. The outboard end 12 of the handgrip aligns with the end of the handlebar tube 9.

The frame 5 is moulded from a rigid resilient plastics material. Its inboard end 19 has a part-cylindrical form with part of the side removed. This extends for about a quarter of the length of the frame. The outboard end 20 of the frame 5 is much narrower, covering only about one tenth of the perimeter of the tube 9. The narrower portion 20 of frame portion 5 forms a rigid elongate tail 58 of the frame portion.

Moulded into a bulge 21 on the distal end of the frame 5 is a package 10 of electronic components including a button-type switch 26, a pietzo buzzer and suitable circuitry to drive the buzzer. The flexible activating face of the switch 26 is exposed on the bulge 21. The circuitry used may be as shown in FIG. 2 of International patent application no. PCT/AU02/01429 the disclosures of which are by this reference incorporated into this present specification. The electronic components and circuitry required for construction of the contents of the electronics assembly are readily apparent to the skilled person from that diagram.

A conventional moulded plastic cradle 17 is provided to house a single A23 H23A 12 volt dry cell battery 16 which drives the circuitry. The cradle 17 includes internal terminals which contact the terminals of the battery, and external terminals 53 and 54 which are soldered to conducting wires or tracks 38 on or in a flexible strap 51. The strap is made from two layers of Mylar between which the conductors 38 are sandwiched.

In use the handgrip 8 is slid onto an open end of a handlebar tube 9 and the inboard collar is clamped to the tube 9 by tightening a grub screw 32. The grub screw 32 is threaded through the collar 4 so it clamps onto the tube. The grub screw also passes in a neat fit through a hole 35 in the frame which positively affixes the frame to the tube. The outboard collar 3 is then clamped to the tube using another grub screw 33. The collar 3 carries a female thread internally and an end cap 56 screws into it after the battery 16 in its cradle 17 is slipped into the end of the tube 9.

The handgrip is made by first attaching the strap 51 to the package 10 of electronic components and to the cradle 17 to form a sub-assembly of electrical components. The frame 5 is then moulded onto and around that sub-assembly. The flexible foam portion of the handgrip is then moulded over the frame so that the portion of the strap 51 which overlies the frame is integrally moulded into the overall structure.

The handgrip 8 is equally applicable for use on the right side or the left side of the handlebars. When on the right side the switch button 26 and the other electronic components in the package 10 are most conveniently positioned facing backwards towards the user.

Figure 3:
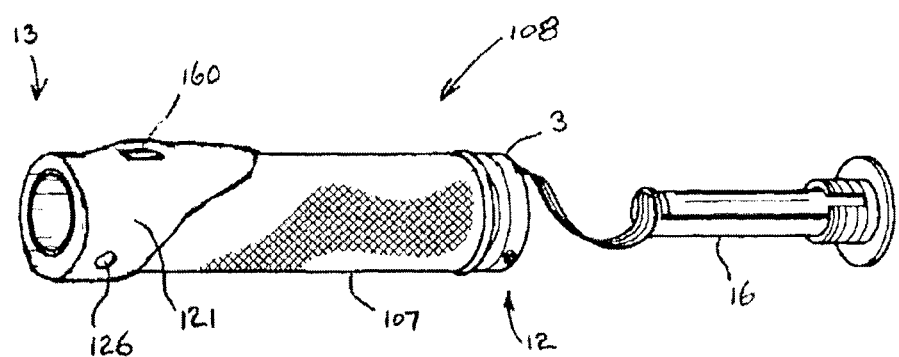
FIG. 3 is a view of a second embodiment of the invention being a handgrip for a handlebar of a bicycle.
Figure 4:
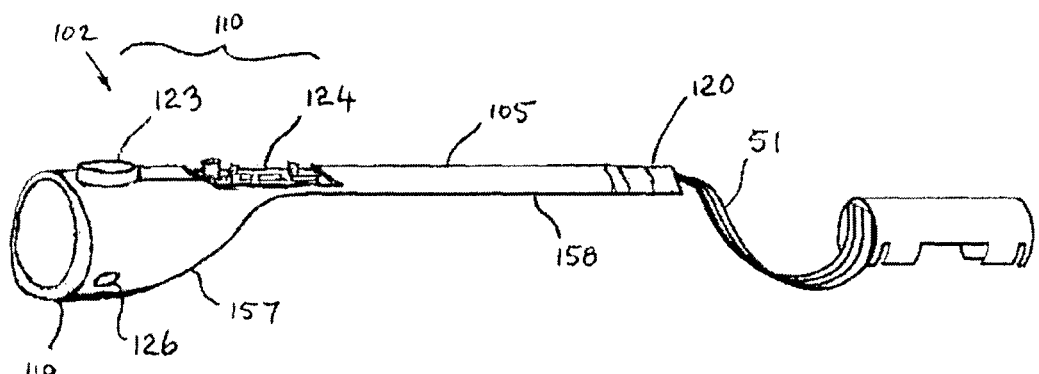
FIG. 4 is a view of some components of the handgrip shown in FIG. 3.

Referring now to FIGS. 3 and 4, the handgrip 108 of the second embodiment of the invention may be fitted to one end of the handlebars of a bicycle in the manner described above with reference to FIGS. 1 and 2. The handgrip 108 incorporates a sound emitting device 102 and has a gripping portion 107 made of soft resilient foam material which is moulded onto a frame 105. The handgrip 108 also comprises a first rigid collar 3 at the proximal (outboard) end 12 of the handgrip.

The frame 105 is moulded from a rigid resilient plastics material. Its main body portion 157 at its inboard end 119 has a fully-cylindrical form. This extends for about a quarter of the length of the frame. The outboard end 120 of the frame 105 is much narrower, covering only about one tenth of the perimeter of the handlebar tube. The narrower portion 120 of frame portion 105 forms a rigid elongate tail 158 of the frame portion.

Moulded into a bulge 121 on the distal end of the frame 105 is a package 110 of electronic components including a button-type switch 126, a pietzo buzzer 123 and suitable circuitry on a printed circuit board 124 to drive the buzzer. The activating face of the switch 126 is exposed on the bulge 121.

Conducting wires linking the printed circuit board and sound generator to the battery are embedded within the tail portion 158. This may be by incorporating it at the moulding stage but may alternatively be accomplished by pressing the wires into a preformed slot in the tail and filling the slot with filler thereafter.

The handgrip 108 as shown is particularly applicable for use on the left hand side of the handlebars. In this position the assembly is upside down to that shown in FIGS. 3 and 4. It then has the advantage that a hole 160 may be left in the moulding to connect with the air space adjacent the pietzo buzzer 123 to allow sound to more effectively escape therefrom while at the same time having the hole facing downwards to minimize water ingress and allow any water that does get in to drain away.

A bicycle may use a sound emitting device as described on each side of the handlebars, but two such handgrips are not necessary. Only one sound emitting handgrip may be used with the other handgrip being chosen to provide a visual match but without the electronic componentry.

It will be understood that where the word "comprise", and variations such as "comprises" and "comprising", are used in this specification, unless the context requires otherwise such use in intended to imply the inclusion of a stated feature or features but is not to be taken as excluding the presence of other feature or features.

The reference to any prior art in this specification is not, and should not be taken as, an acknowledgment or any form of suggestion, that such prior art forms part of the common general knowledge.

The invention claimed is:

1. A handgrip assembly including a sound emitting assembly, the handgrip assembly adapted to be slid over and into a tube end at an end portion of a tubular handlebar, and the handgrip assembly comprising:
   a gripping portion adapted to be retained on the outside surface of said end portion of the handlebar, said gripping portion having:
      a proximal end which in use lies at or closely adjacent the end of the tube, and
      a distal end which in use lies away from the end of the tube; and
   a source of stored electric power which in use is retained on the inside of the end portion of the handlebar;
wherein said gripping portion comprises a resilient foam portion moulded onto a rigid frame portion, said rigid frame portion being moulded from plastics material and comprising:
   a main body portion which extends around at least most of the circumference of the tube at said distal end,
   a rigid elongate tail portion which extends from the main body portion to at least substantially the proximal end,
   an actuating switch located in said main body portion;
   a sound emitting assembly located in said main body portion, said sound emitting assembly comprising an electronically actuated sound generator, and an electronic circuit to feed a signal to the sound generator;
wherein said sound emitting assembly and said actuating switch are linked to said source of stored electric power by an electric pathway which extends along said rigid tail portion such that when the switch is activated by a user, a sound is emitted from said sound generator in the handgrip.

2. A handgrip assembly according to claim 1 wherein said sound emitting assembly and said actuating switch are linked to said source of stored electric power by an electric pathway which extends within said rigid tail portion.

3. A handgrip assembly according to claim 1 wherein said electric pathway extends from said rigid tail portion to pass from outside to inside the tube at the end of the tube.

4. A handgrip assembly according to claim 1 wherein the electric pathway comprises conducting wires or strips moulded into said rigid tail portion.

5. A handgrip assembly according to claim 1 wherein the main body portion of the rigid frame portion extends completely around the tube at said distal end of the gripping portion.

6. A handgrip assembly according to claim 1 wherein the main body portion of the rigid frame portion extends mostly but not completely around the tube at said distal end of the gripping portion.

7. A handgrip assembly according to claim 1 wherein the rigid frame portion is an integral moulding.

* * * * *